United States Patent [19]

Budecker

[11] 4,332,270

[45] Jun. 1, 1982

[54] FLOW CONTROL AND ACCUMULATOR CHARGING VALVE

[75] Inventor: Ludwig Budecker, Frankfurt, Fed. Rep. of Germany

[73] Assignee: ITT Industries, Inc., New York, N.Y.

[21] Appl. No.: 60,946

[22] Filed: Jul. 26, 1979

[30] Foreign Application Priority Data

Aug. 23, 1978 [DE] Fed. Rep. of Germany ....... 2836816

[51] Int. Cl.[3] .............................................. G05D 15/00

[52] U.S. Cl. .................................... 137/101; 137/118; 60/418

[58] Field of Search .................... 137/101, 118; 60/418

[56] References Cited

U.S. PATENT DOCUMENTS 3,570,519 3/1971 Bianchetta ........................ 60/418 X
3,886,848 6/1975 Budecker et al. ................ 60/418 X
3,911,679 10/1975 Matthews ......................... 60/418 X
4,016,895 4/1977 Budecker ............................ 137/101
4,084,604 4/1978 Budecker et al. .................... 137/101
4,130,127 12/1978 Budecker et al. .................... 137/101

*Primary Examiner*—William R. Cline
*Attorney, Agent, or Firm*—John T. O'Halloran; Alfred C. Hill

[57] ABSTRACT

The valve device disclosed includes first, second and third user ports. A pressure accumulator connects with the first user port. With the accumulator fully charged, a pressure port connected to a pump communicates with the second user port. With the accumulator evacuated, the pressure port communicates with the first user port. In the event of a fluid demand at the third user port connected to a closed-center user component, the pressure port will be connected to the third user port via a control valve.

27 Claims, 3 Drawing Figures

FLOW CONTROL AND ACCUMULATOR CHARGING VALVE

BACKGROUND OF THE INVENTION

This invention relates to a valve device having a pressure port connected to a pump; a first user port which is in communication with a pressure accumulator and a first user component and connectible with the pressure port through a throttle and a check valve; and a second user port which is connectible with the pressure port through a by-pass valve, the by-pass valve having a by-pass piston whose effective surface adapted to be subjected to pressure in the opening direction connects with the pressure port and whose effective surface adapted to be subjected to pressure in the closing direction and extending into a control chamber connects with the pressure port through a throttle and an accumulator-pressure-responsive pilot valve when the accumulator pressure is below a predetermined limit, and connects with a return line when the accumulator pressure has reached the predetermined limit.

From German Pat. DE-OS No. 2,625,555 a valve device is known which includes a pressure port connected to a pump. A connection leads from the pressure port through a throttle and a check valve to a first user port, with a first closed-center user component and a pressure accumulator being in communication with the first user port.

Further, the pressure port is connectible with a second user port through a by-pass valve, the second user port connecting with a second open-center user component.

The by-pass valve includes a by-pass piston whose effective surface adapted to be subjected to pressure in the opening direction is connected to the pressure port. The by-pass piston's effective surface which is adapted to be subjected to pressure in the closing direction connects with a pilot valve operating in response to the accumulator pressure. Below a predetermined accumulator pressure, the effective surface subjected to pressure in the closing direction connects with the pressure port through the pilot valve and a throttle, and when the predetermined accumulator pressure is attained, it connects with an unpressurized return line through the pilot valve.

If it is desired to use the known valve device for supplying fluid to another, third, closed-center user component without the function of the existing valve components being adversely affected, the third user component would have to be connected to the first user port. To avoid damage to the accumulator, the fluid deliverable from the pressure port to the first user port is limited to a predetermined amount by the throttle, and, therefore, it is not possible to supply fluid from the first user port to a third user component requiring a large amount of fluid. Such a user component is, for example, an antiskid apparatus in an automotive vehicle.

SUMMARY OF THE INVENTION

It is, therefore, an object of the present invention to provide a valve device of the above-mentioned type which permits the supply of fluid to a third user component having a large volume flow, without the function of by-pass valve and pilot valve being adversely affected.

A feature of the present invention is the provision of a valve device comprising a pressure port connected to a pump, a first user port in communication with a pressure accumulator and a first user component, the first user port being connectible to the pressure port through a first conduit having a first throttle and a first check valve disposed therein, a second user port in communication with a second user component and connectible with the pressure port through a by-pass valve including a by-pass piston having a first effective surface adjacent the pressure port adapted to be subjected to pressure at the pressure port in the opening direction of the by-pass valve and a second effective surface spaced from the first effective surface adapted to be subject to pressure from the pressure port in the closing direction of the by-pass valve, the second effective surface being disposed in a control chamber, the control chamber being connected to the pressure port through the first throttle and an accumulator-pressure-responsive pilot valve when the pressure of the accumulator is below a predetermined limit, and to a return line when the pressure of the accumulator reaches the predetermined limit, and a third user port in communication with a third user component requiring a large amount of pressure transmitting fluid and connectible with the pressure port through a control valve whose valve passageway is open when the third user component demands fluid.

In this arrangement, the cross section of passage of the line connecting the pressure port to the third user port is greater than the cross section of passage of the line connecting the pressure port to the first user port.

In an advantageous embodiment of the control valve, the control valve includes an operating piston adapted to shut off the valve passageway, the operating piston being spring-loaded in the closing direction and having a first effective surface subjected to the pressure at the first user port in the opening direction as well as a second effective surface subjected to the pressure at the third user port in the closing direction, and the first user port is connected to the third user port through a conduit in which a throttle is arranged. This control valve, which forms a hydraulic balance, opens automatically in the event of fluid demand at the third user component, effecting at the same time switching of the operating valve and closing of the by-pass valve as a result of the pressure drop across the first user port and in the pressure accumulator, so that at least the major part of the fluid delivered by the pump is supplied to the third user component.

In an advantageous embodiment, the operating piston is axially slidable in a cylindrical bore, subdividing the cylindrical bore into a first and a second chamber, the first chamber being connected to the first user port and the operating piston's end surface close to the first chamber being the first effective surface, and the second chamber being connected to the third user port and the operating piston's end surface close to the second chamber being the second effective surface. In a simple embodiment of the operating piston, it is a hollow piston including an axial bore therethrough whose cross section forms the throttle connecting the first user port with the third user port. This arrangement obviates the need for a special duct incorporating a throttle between the first and the second chamber.

In order to obtain precisely defined operating positions of the operating piston, the axial stroke of the operating piston is advantageously limited by stops, with a conduit connected to the pressure port and opening into the cylindrical bore radially being exposed in the one end position of the operating piston while being covered by the circumferential surface of the operating piston in the other end position of the operating piston. In this arrangement, the conduit may be connected to the first chamber with the control valve open, so that the fluid flow is directed from the pressure port to the third user port through the first chamber and the throttle of the control valve.

In another embodiment, the conduit may be connected to the second chamber with the control valve open. In that case, the fluid flows directly from the pressure port to the second chamber and to the third user port, by-passing the throttle of the control valve.

In still another embodiment, the conduit may be connected to both the first chamber and the second chamber with the control valve open. In this arrangement, the operating piston includes advantageously an annular control groove provided on its cylindrical circumferential surface and bounded by two radial circumferential controlling edges, the control groove being so arranged that in the closed position of the control valve the controlling edges close a connection of the conduit to the first and second user ports.

In another advantageous embodiment of the present invention, the operating piston is a stepped piston having its smaller step formed at the end adjacent the first user port, the end of the smaller step being designed as a valve closure member isolating the annular chamber formed between the smaller step and the cylindrical bore from the first user port when the control valve is closed. It is thereby avoided that high pressures which may develop in the closed position of the control valve from the pressure port through the gap at the controlling edges, which gap is caused by tolerances, in the annular chamber between the smaller step and the cylindrical bore, propagate up to the first user port and the pressure accumulator which may be damaged thereby. Such high pressures develop, for instance, if the second user component is a power steering gear wherein a very high pressure may build up under specific operating conditions. The valve closure member formed at the end surface of the operating piston is advantageously suitable for seating engagement with a valve seat provided at the connection between the cylindrical bore and the first user port. The sealing surface of the valve closure member may be an elastomeric material.

In order to be able to relieve the annular chamber between the smaller step and the cylindrical bore of pressure, the annular chamber is advantageously connected through a radial bore with that part of the through bore of the operating piston that is in communication with the third user port.

To avoid the propagation of a high pressure from the third user port through the bore of the operating piston to the first user port, the passage of the bore in the area of the throttle is advantageously arranged to be shut off by a check valve preventing fluid flow from the third to the first user port.

A filter is advantageously arranged in the third user port.

In order to ensure that a predetermined minimum amount of fluid is at all times available to the second user component when the third user component has a demand for fluid, a throttle is advantageously arranged in the conduit leading from the pressure port to the cylindrical bore.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
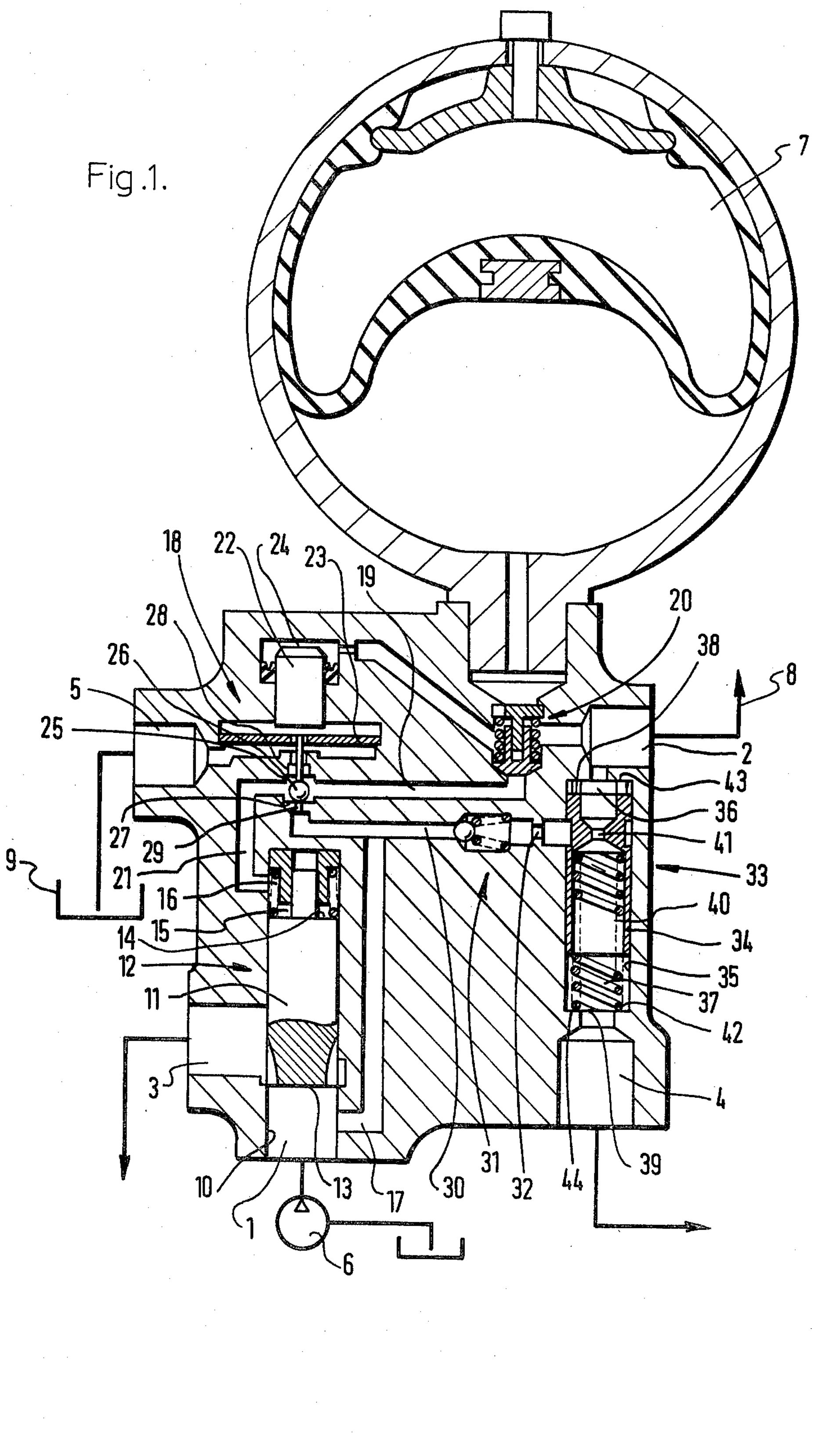
FIG. 1 is a longitudinal cross sectional view of a valve device constructed in accordance with the principles of the present invention.

The valve device of FIG. 1 illustrates a housing including a pressure port 1, a first user port 2, a second user port 3, a third user port 4 and a return port 5. Pressure port 1 is connected to a pump 6, while first user port 2 connects with a pressure accumulator 7 and a first user component 8. Return port 5 connects with an unpressurized reservoir 9. Pressure port 1 is connected to a cylindrical bore 10 accommodating axially slidably therein a by-pass piston 11 of a by-pass valve 12, the piston being arranged to control the cross section of the passage from pressure port 1 to second user port 3. By-pass piston 11 has an effective surface 13 which is subjected to the pressure at pressure port 1 in the opening direction of by-pass valve 12. Another effective surface 14 of by-pass piston 11 which is subjected to pressure in the closing direction extends into a control chamber 15 formed in cylindrical bore 10. Control chamber 15 also houses a compression spring 16 which bears upon by-pass piston 11 in the closing direction.

A conduit 17 leads from pressure port 1 to a pilot valve 18 from which another conduit 19 leads to first user port 2 through a check valve 20. Conduit 19 is also in communication with control chamber 15 through a connection 21.

Pilot valve 18 includes an operating piston 22 having an effective surface 24 which is subjected to the accumulator pressure against the force of a compression spring 23. The closure member 25 of pilot valve 18 is designed as a ball and movable into its operating positions by operating piston 22. Pilot valve 18 is designed as a dual-seat valve including a valve chamber 26 in which closure member 25 is situated. The two valve seats 27 and 28 of the dual-seat valve are the orifices of the conduit leading from conduit 17 to valve chamber 26 and of the conduit connecting valve chamber 26 with return port 5, the orifices opening into valve chamber 26 on opposite sides. Conduit 19 connects valve chamber 26 to first user port 2 through check valve 20.

Valve seat 27 is of a cross section forming a throttle 29.

Branching off from conduit 17 is a conduit 30 which leads to a control valve 33 via a check valve 31 and a throttle 32. Control valve 33 of FIG. 1 includes an operating piston 34 which is axially slidable in a cylindrical bore 35 and divides cylindrical bore 35 into a first chamber 36 and a second chamber 37. First chamber 36 is connected to first user port 2 and second chamber 37 is connected to third user port 4. The end surface of operating piston 34 adjacent first chamber 36 forms a first effective surface 38 subjected to pressure in the opening direction of control valve 33, while the end surface adjacent second chamber 37 forms a second effective surface 39 subjected to pressure in the closing direction of control valve 33.

Operating piston 34 is a hollow piston having a bore 40 extending axial therethrough in which a throttle 41 is disposed. Thus, first and second chamber 37 and 38 are connected through bore 40 and throttle 41. A spring 42 bears upon operating piston 34 in the closing direction, the piston stroke being limited by stops 43 and 44.

In the closed position of control valve 33 as illustrated in FIG. 1, conduit 30 which opens radially into cylindrical bore 35 is shut off by the circumferential surface of operating piston 34, thus, closing the valve passageway.

In the opening direction of control valve 33, conduit 30 is connected to first chamber 36 so that fluid is allowed to flow from pressure port 1 through conduits 17 and 30, first chamber 36, throttle 41 and chamber 37 to third user port 4.

Figure 2:
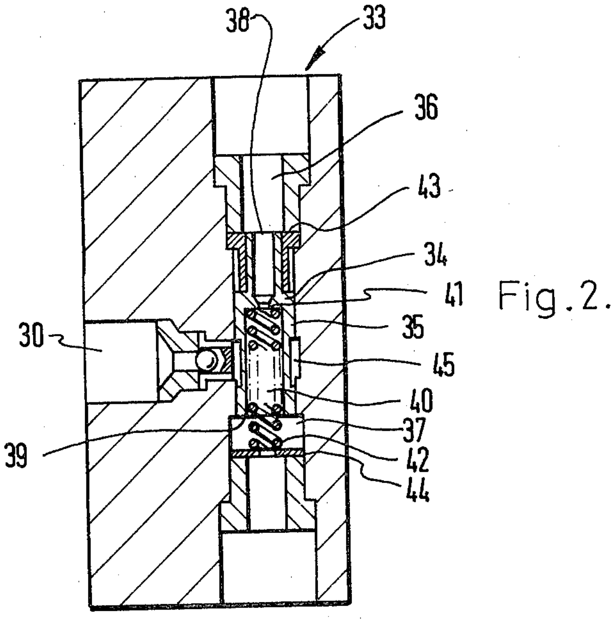
FIG. 2 is a longitudinal cross sectional view of a second embodiment of a control valve that may be employed in the valve device of FIG. 1.

Control valve 33 illustrated in FIG. 2 includes also an operating piston 34 which is axially slidable in a cylindrical bore 35 and separates the latter into a first chamber 36 and a second chamber 37.

Operating piston 34 also possesses a first effective surface 38 adjacent first chamber 36 and a second effective surface 39 adjacent second chamber 37. Further, first and second chambers 36 and 37 are connected by means of a through bore 40 provided axially in operating piston 34 and housing a throttle 41. A spring 42 bears upon operating piston 34 in the closing direction of control valve 33, the piston stroke being limited by two stops 43 and 44. A radially circumferential control groove 45 on the circumferential surface of operating piston 34 is so designed that conduit 30 opening radially into cylindrical bore 35 is connected to second chamber 37 via control groove 45 in the open position of control valve 33.

Figure 3:
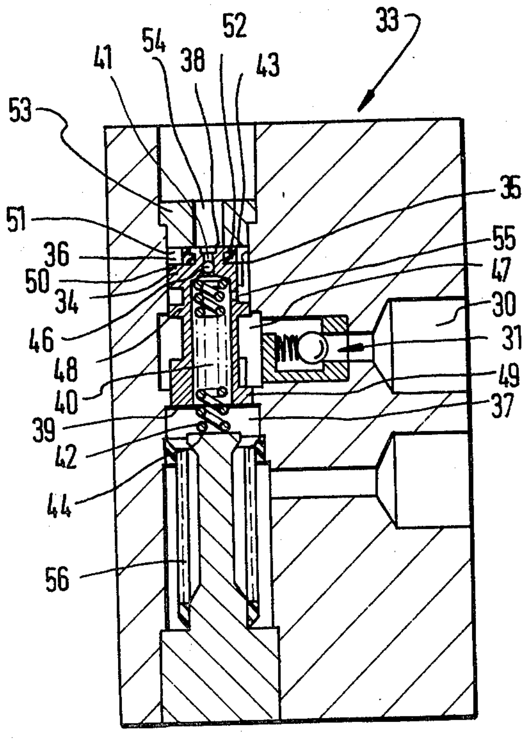
FIG. 3 is a longitudinal cross sectional view of a third embodiment of a control valve that may be employed in the valve device of FIG. 1.

Control valve 33 illustrated in FIG. 3 includes an operating piston 34 which is axially slidable between two stops 43 and 44 in a cylindrical bore 35 and subdivides cylindrical bore 35 into a first chamber 36 connectible with first user port 2 and a second chamber 37 connected with third user port 4. In this arrangement, the end surface adjacent first chamber 36 forms a first effective surface 38, and the end surface adjacent second chamber 37 forms a second effective surface 39. Operating piston 34 is a hollow piston having an axial through bore 40 in which a throttle 41 is disposed. A check valve 46 arranged in the area of throttle 41 inhibits fluid flow from third user port 4 to first user port 2 through bore 40.

Operating piston 34 has on its circumferential surface a radial circumferential control groove 47 which is bounded by two controlling edges 48 and 49. The control groove 47 is so arranged that in the closed position of control valve 33 conduit 30 opening radially into cylindrical bore 35 is isolated from first chamber 36 and second chamber 37, respectively, by the controlling edges 48 and 49 located on both sides of the orifice of conduit 30. In the open position of control valve 33, controlling edges 48 and 49 open a passage from conduit 30 to first chamber 36 and to second chamber 37 respectively.

Operating piston 34 is loaded by a spring 42 in the closing direction.

On its side close to first user port 2, operating piston 34 is stepped so that an annular chamber 51 is formed between its smaller step 50 and cylindrical bore 35. The end surface of smaller step 50 is designed as a valve closure member 52 whose sealing surface is of an elastomeric material and abuts, in the closed position of control valve 33, against a wall 53 separating first chamber 36 from first user port 2. such that a passage bore 54 formed in wall 53 is closed. Thus, annular chamber 51 is isolated from first user port 2 in the closed position of control valve 33.

A radial bore 55 connects annular chamber 51 with the part of bore 50 that is in communication with third user port 4.

To prevent the ingress of dirt particles in the third user component, a filter 56 is disposed in third user port 4.

Further, a check valve 31 is arranged in conduit 30.

The operation of the valve device of the present invention is as follows:

With pressure accumulator 7 discharged, pilot valve 18 assumes a position in which both control chamber 15 is connected to pressure port 1 and fluid is allowed to flow from pressure port 1 to first user port 2 via check valve 20. The pressure acting on effective surface 14 and the force of compression spring 16 cause displacement of by-pass piston 11 in the closing direction of by-pass valve 12, so that the connection from pressure port 1 to second user port 3, which may have a power steering gear connected thereto, is at least partially closed.

As soon as the pressure at first user port 2 and in pressure accumulator 7 has attained a predetermined limit, operating piston 22 causes closure member 25 of pilot valve 18 to move into its other position in which control chamber 15 and conduit 19 are connected to return port 5. As a result, the only force still acting on by-pass piston 11 in the closing direction is that of compression spring 16 so that the pump delivery pressure acting on effective surface 13 shifts by-pass piston 11 in the opening direction and all the fluid is directed to second user port 3.

As long as the closed-center user component connected to third user port 4 is not connected in the circuit, the pressure prevailing in first chamber 36 and second chamber 37 is the same as the pressure at first user port 2. If the third user component, which may be an antiskid apparatus is connected in the circuit, the pressure in second chamber 37 drops immediately so that the higher presure prevailing in first chamber 36 overcomes the force of spring 42, moves operating piston 34 into its opening position until its abutment with stop 44 and opens the orifice of conduit 30 opening into cylindrical bore 35. Since by-pass valve 12 is still open, the fluid supplied flows directly to the second user component and not yet to the third user component via control valve 33.

Since the third user component's fluid demands are very high, pressure accumulator 7 is depleted immediately so that pilot valve 18 switches and by-pass piston's 11 effective surface 14 is subjected to pressure in the closing direction. As a result, by-pass piston 11 is shifted into the closing direction so that only part of the fluid delivered is then supplied through conduit 30, check valve 31, throttle 32 and control valve 33 to third user port 4 and, thus, to the third user component.

The function of throttle 32 is to prevent all the fluid delivered to flow to the third user component and to ensure that a predetermined minimum amount of fluid is also supplied to the second user component.

In control valve 33 illustrated in FIG. 1, the fluid flows from conduit 30 through first chamber 36, throttle 41 and second chamber 37 to third user port 4. In this arrangement, it is possible at the same time to charge pressure accumulator 7 from first chamber 36.

In control valve 33 of FIG. 2, the fluid flows from conduit 30 directly to second chamber 37 and, hence, to third user port 4, and no charging of pressure accumulator 7 takes place.

In control valve 33 of FIG. 3, the fluid flows from conduit 30 to both first chamber 36, charging accumulator 7, and second chamber 37 and, hence, third user port 4.

Valve closure member 52, which isolates annular chamber 51 from first user port 2 with control valve 33 closed, and check valve 46 prevent the propagation of a high pressure from conduit 30 via the gap between operating piston 34 and cylindrical bore 35 to first user port 2 which high pressure may damage accumulator 7.

If the fluid demand of the third user component ceases, identical pressures will again develop in chambers 36 and 37 so that spring 42 urges operating piston 34 into abutment with stop 43 in its closing position.

In FIG. 2, there follows first charging of the accumulator 7 before—as is the case in FIGS. 1 and 3—the valve device again circulates fluid to the second user component.

While I have described above the principles of my invention in connection with specific apparatus it is to be clearly understood that this description is made only by way of example and not as a limitation to the scope of my invention as set forth in the objects thereof and in the accompanying claims.

I claim:

1. A valve device comprising;

a pressure port connected to a pump;

a first user port in communication with a pressure accumulator and a first user component, said first user port connected to said pressure port through a first conduit having a first throttle and a first check valve disposed therein;

a second user port in communication with a second user component and connected with said pressure port through a by-pass valve including a by-pass piston having a first effective surface adjacent said pressure port subjected to pressure at said pressure port in the opening direction of said by-pass valve and a second effective surface spaced from said first effective surface subjected to pressure from said pressure port in the closing direction of said by-pass valve; said second effective surface being disposed in a control chamber, said control chamber connected to said pressure port through said first throttle and an accumulator-pressure-responsive pilot valve when the pressure of said accumulator is below a predetermined limit and to a return line when the pressure of said accumulator reaches said predetermined limit;

a third user port in communication with a third user component requiring a large amount of pressure transmitting fluid and connected with said pressure port through a control valve, said control valve including an operating piston spring loaded in the closing direction of said control valve and having a third effective surface subjected to the pressure at said first user port in the opening direction of said control valve and a fourth effective surface subjected to the pressure at said third user port in the closing direction of said control valve, said third user port connected to said first user port through a second throttle, said operating piston is axially slidable in a cylindrical bore and subdivides said cylindrical bore into first and second chambers, said first chamber connected to said first user port and said second chamber connected to said third user port, the end surface of said operating piston adjacent said first chamber is said third effective surface and the end surface of said operating piston adjacent said second chamber is said fourth effective surface, said operating piston is a hollow piston including an axial bore therethrough having a portion thereof dimensioned to provide said second throttle; the axial stroke of said operating piston is limited by spaced stops provided in said cylindrical bore; and a second conduit connected to said pressure port opens radially into said cylindrical bore, said second conduit being open in one end position of said operating piston and being closed by the circumferential surface of said operating piston in the other end position of said operating piston.

2. A valve device according to claim 1, wherein said second conduit is connected to said first chamber when said operating piston is in said one end position which opens said control valve.

3. A valve device according to claim 1, wherein said second conduit is connected to said second chamber when said operating piston is in said one end position which opens said control valve.

4. A valve device according to claim 1, wherein said second conduit is connected to both said first and second chambers when said operating piston is in said one end position which opens said control valve.

5. A valve device according to claim 4, wherein said operating piston includes an annular control groove on its cylindrical circumferential surface bounded by two spaced radially extending controlling edges, said control groove being disposed with respect to said second conduit so that said controlling edges close the connection between said second conduit and said first and second chambers when said operating piston is in said other end position which closes said control valve.

6. A valve device according to claim 5, wherein said operating piston is a stepped piston having its smaller step disposed adjacent said third effective surface and providing said first chamber in the form of an annular chamber formed between said smaller step and the inner surface of said cylindrical bore, the end of said smaller step providing a valve closure member to isolate said annular chamber from said first user port when said operating piston is in said other end position which closes said control valve.

7. A valve device according to claim 6, wherein said valve closure member is suitable for seating engagement with a valve seat provided at a connection between said cylindrical bore and said first user port.

8. A valve device according to claim 7, wherein said valve closure member includes a sealing surface made of an elastomeric material.

9. A valve device according to claim 8, wherein said annular chamber is connected to that portion of said axial bore that is in communication with said third user port via a radial bore through the wall of said hollow piston.

10. A valve device according to claim 9, further including:

a second check valve disposed in said axial bore adjacent said second throttle to prevent fluid flow from said third user port to said first user port.

11. A valve device according to claim 10, further including a filter disposed in said third user port.

12. A valve device according to claim 11, further including a third check valve disposed in said second conduit.

13. A valve device according to claim 12 further including a third throttle disposed in said second conduit between said third check valve and said cylindrical bore.

14. A valve device according to claim 6, further including a second check valve disposed in said axial bore adjacent said second throttle to prevent fluid flow from said third user port to said first user port.

15. A valve device according to claim 14, further including a third check valve disposed in said second conduit.

16. A valve device according to claim 15, further including a filter disposed in said third user port.

17. A valve device according to claim 16, further including a third throttle disposed in said second conduit between said third check valve and said cylindrical bore.

18. A valve device according to claim 1, further including a second check valve disposed in said axial bore adjacent said second throttle to prevent fluid flow from said third user port to said first user port.

19. A valve device according to claim 18, further including a third check valve disposed between said pressure port and said cylindrical bore.

20. A valve device according to claim 19, further including a third throttle disposed between said third check valve and said cylindrical bore.

21. A valve device according to claim 20, further including a filter disposed in said third user port.

22. A valve device according to claim 1, further including a second check valve disposed between said pressure port and said control valve.

23. A valve device according to claim 22, further including a second throttle disposed between said second check valve and said control valve.

24. A valve device according to claim 23, further including a filter disposed in said third user port.

25. A valve device according to claim 1, further including a second throttle disposed between said pressure port and said control valve.

26. A valve device according to claim 25, further including a filter disposed in said third user port.

27. A valve device according to claim 1, further including a filter disposed in said third user port.

* * * * *